United States Patent [19]

Holzhauser et al.

[11] 4,410,264

[45] Oct. 18, 1983

[54] RECEIVER SHEET TRANSPORT WITH A GUIDING MEMBER AND ALIGNING MECHANISM

[75] Inventors: Ronald C. Holzhauser, Holley; James A. McGlen, Rochester, both of N.Y.

[73] Assignee: Eastman Kodak Company, Rochester, N.Y.

[21] Appl. No.: 353,780

[22] Filed: Mar. 1, 1982

[51] Int. Cl.³ .................... G03G 15/00; G03G 15/01
[52] U.S. Cl. .................. 355/3 TR; 355/3 SH; 355/3 R; 355/14 TR; 355/4; 271/276
[58] Field of Search ........... 355/3 TR, 3 SH, 3 TE, 355/3 R, 4, 14 R, 14 TR, 14 SH; 271/82, 85, 90, 196, 152, 153, 204, 205, 275, 276, 277, 229, 231; 118/653, 621; 101/132; 430/126; 313/299

[56] References Cited

U.S. PATENT DOCUMENTS

| | | | |
|---|---|---|---|
| 3,460,472 | 8/1969 | Trumbull et al. | 118/621 |
| 3,533,618 | 10/1970 | Carstens | 271/276 |
| 3,633,543 | 1/1972 | Pitasi et al. | 101/132 |
| 3,879,121 | 4/1975 | Simpson | 355/3 R |
| 3,936,174 | 2/1976 | Carpenter | 355/3 R |
| 4,024,814 | 5/1977 | Becker | 271/276 X |
| 4,025,178 | 5/1977 | Yokozawa et al. | 355/3 R |
| 4,056,057 | 11/1977 | Smith | 271/276 X |
| 4,072,412 | 2/1978 | Suda et al. | 355/3 TR |
| 4,127,265 | 11/1978 | Wirz et al. | 271/276 X |
| 4,204,471 | 5/1980 | Becker | 271/277 X |
| 4,213,551 | 7/1980 | Windele | 355/3 TR X |
| 4,234,305 | 11/1980 | Miyake et al. | 355/3 SH X |

FOREIGN PATENT DOCUMENTS

| | | |
|---|---|---|
| 914398 | 11/1972 | Canada . |
| 950933 | 7/1974 | Canada . |
| 1337123 | 11/1973 | United Kingdom . |
| 1368500 | 9/1974 | United Kingdom . |

*Primary Examiner*—A. C. Prescott
*Attorney, Agent, or Firm*—Lawrence P. Kessler

[57] ABSTRACT

An improved receiver sheet transport for use in apparatus for transferring related transferable marking particle images seriatim, from spaced areas on a member onto a receiver sheet. The apparatus moves a receiver sheet successively into transfer relation with the related transferable images on the member. The receiver sheet is attached to the apparatus with a portion of such sheet intermediate the lead and trail edges being self-supporting. An aligning mechanism engages the lead edge of the receiver sheet so that the sheet is aligned with an area on the member. A guiding member guides the receiver sheet into engagement with the aligning mechanism. Transfer of such related images onto the sheet in accurate superimposed register is effected when such self-supporting portion is in transfer relation with related transferable images on the image-carrying member. The guiding member and the aligning mechanism are mounted for movement to a first position at which an aligned receiver sheet is urged by the guiding member into clamped engagement with the apparatus, or to a second position at which such receiver sheet is out of clamped engagement with the apparatus and the guiding member and aligning mechanism are remote from such receiver sheet.

9 Claims, 7 Drawing Figures

RECEIVER SHEET TRANSPORT WITH A GUIDING MEMBER AND ALIGNING MECHANISM

RELATED APPLICATION

This Application is related to commonly assigned U.S. patent application Ser. No. 353,779, filed on even date in the name of Gustafson, and U.S. patent application Ser. No. 353,778 filed on even date in the name of Gustafson et al.

BACKGROUND OF THE INVENTION

This invention relates in general to a receiver sheet transport for use in an electrographic copier, and more particularly to apparatus including an improved transport for successively moving a receiver sheet into alignment with related transferable marking particle images on a moving member for transfer of such images seriatim from the member to the aligned sheet in accurate superimposed register.

In making multicolor reproductions (copies) with a plain paper electrophotographic copier, for example, a multicolored document is illuminated to provide color separation images of the document. The color separation images expose a charged photoconductive member, at spaced image-receiving areas along the member, to form latent image charge patterns on the member corresponding to the respective color separation images. The latent image charge patterns are developed with appropriately colored marking particles (toner) to form transferable images. The transferable images are transferred from the photoconductive member to a receiver sheet in superimposed register to form a multicolor reproduction of the multicolor document.

In order to transfer the transferable images from the image-receiving areas to the receiver sheet in superimposed register, the receiver sheet is moved in a path to repetitively bring the sheet into transfer relation with the photoconductive member at a transfer station. In the aforementioned U.S. patent application Ser. No. 353,779, apparatus is disclosed which includes a transport for successively moving a receiver sheet into transfer relation with related transferable images in the image-receiving areas on the photoconductive member for accurate superimposed register of images transferred to the sheet. A corona transfer charger effects transfer of such images seriatim from the member onto such receiver sheet. The transport employs a tow bar having vacuum plenums for capturing the lead and trail edges of a receiver sheet so that a portion of the sheet intermediate the lead and trial edges is self-supporting. The tow bar does not block the field of the corona transfer charger during transfer, and the self-supporting portion of the receiver sheet conforms to the photoconductive member during transfer to prevent positional misregistration between subsequent images transferred to such sheet. The use of vacuum for capturing the lead edge, however, does not insure that the receiver sheet is in accurate alignment with the image-receiving areas of the photoconductive member. Accordingly, while the transferable images are transferred to the receiver sheet in accurate superimposed register, the resultant reproduction may not be properly positioned on the receiver sheet. In the aforementioned U.S. patent application Ser. No. 353,778, an improved transport is disclosed which securely clamps the lead edge of the receiver sheet in alignment with the head edge of an image-receiving area of the photoconductive member. However, in such transport the clamp does not effect positive release of the receiver sheet after transfer is completed.

SUMMARY OF THE INVENTION

This invention is directed to an improved receiver sheet transport for use in apparatus for transferring related transferable marking particle images seriatim, from spaced areas on a member onto a receiver sheet. The apparatus moves a receiver sheet successively into transfer relation with the related transferable images on the member. The receiver sheet is attached to the apparatus with a portion of such sheet intermediate the lead and trail edges being self-supporting. An aligning mechanism engages the lead edge of the receiver sheet so that the sheet is aligned with an area on the member. A guiding member guides the receiver sheet into engagement with the aligning mechanism. Transfer of such related images onto the sheet in accurate superimposed register is effected when such self-supporting portion is in transfer relation with related transferable images on the image-carrying member. The guiding member and the aligning mechanism are mounted for movement to a first position at which an aligned receiver sheet is urged by the guiding member into clamped engagement with the apparatus, or to a second position at which such receiver sheet is out of clamped engagement with the apparatus and the guiding member and aligning mechanism are remote from such receiver sheet.

The invention, and its objects and advantages, will become more apparent in the detailed description of the preferred embodiment presented below.

BRIEF DESCRIPTION OF THE DRAWINGS

In the detailed description of the preferred embodiment of the invention, reference is made to the accompanying drawings, in which:

FIG. 6 is an end view of a portion of the apparatus of FIG. 4 on an enlarged scale, with such portion in position to effect the alternate position of the transport shown in FIG. 3a.

DESCRIPTION OF THE PREFERRED EMBODIMENT

Figure 1:
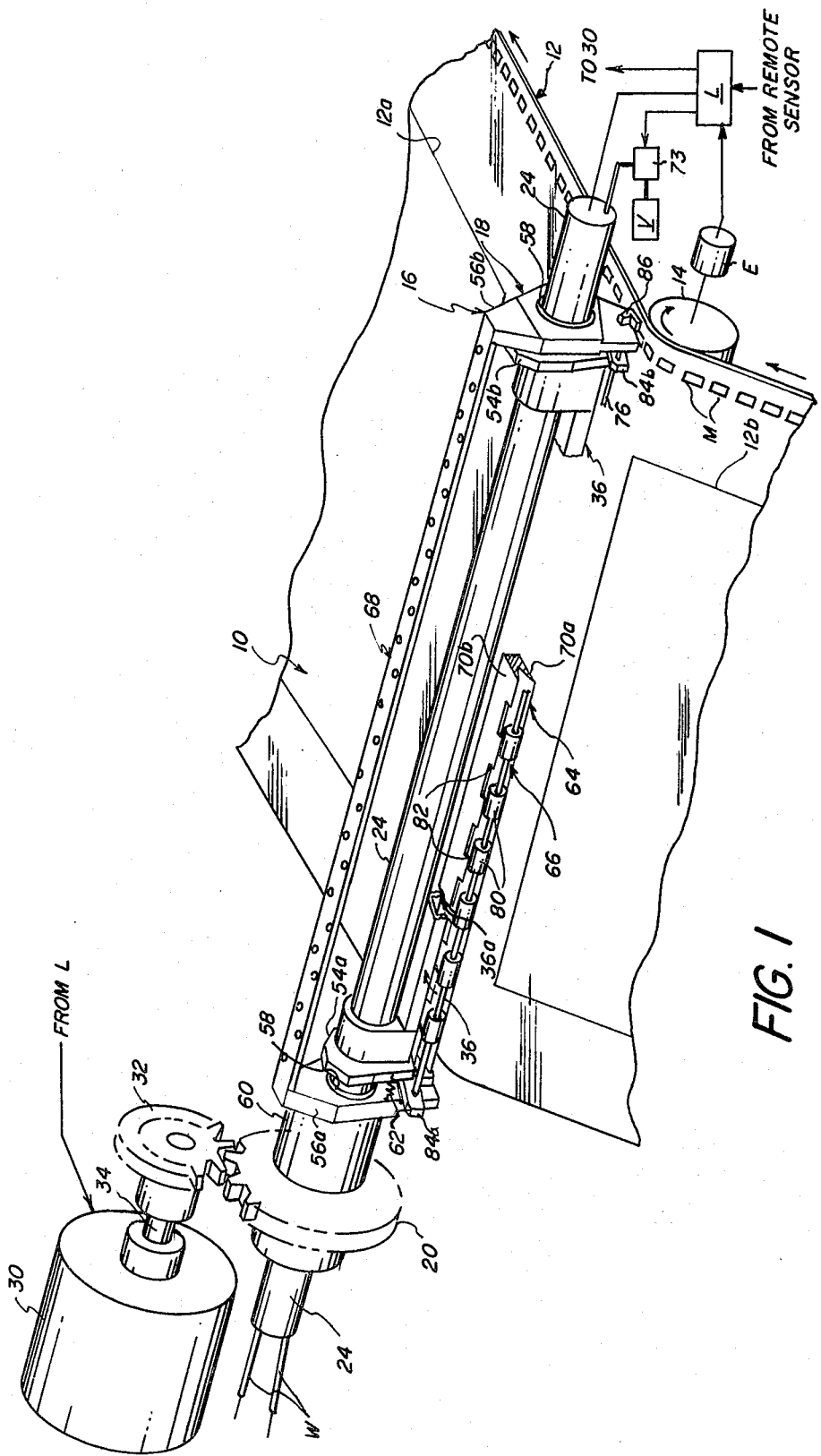
FIG. 1 is a view, in perspective of an electrographic transfer apparatus particularly showing an improved receiver sheet transport according to this invention, with portions removed or broken away to facilitate viewing.

Referring now to the drawings, FIG. 1 shows a transfer apparatus 10 of an electrographic copier for transferring marking particle images from a moving member (web 12) to a receiver sheet. The apparatus is illustratively described with relation to a copier for making color reproductions formed by accurate superimposed transfer of related transferable images, corresponding to color separation images of input information, from an image-carrying member to a receiver sheet. The accurate superimposed transfer of such related images, provided by the apparatus 10, is important for forming a faithful color reproduction. However, this invention is also useful in an apparatus associated with a copier for making monochrome reproductions formed by transfer of related transferable images of a single color where accurate superimposed transfer is important.

In a copier apparatus of the electrophotographic type, the web 12 is a grounded photoconductive belt having sequentially spaced image-receiving areas (e.g. areas 12a, 12b of FIG. 1), for example. Such belt is suitably of the type disclosed in U.S. Pat. No. 3,615,414 issued Oct. 26, 1971 in the name of Light. It is, of course, within the scope of this invention that the member could take the form of a photoconductive drum or a plurality of discrete sheets of photoconductive material. When a multicolor reproduction is to be made from a multicolor input information, a uniform electrostatic charge on the web is selectively reduced in the image-receiving areas by exposure to related primary color separation images (red, green, blue) of such original multicolor input information, leaving latent image charge patterns corresponding to the color separation images.

Exposure is effected, for example, by reflecting a light image from an original multicolor document through primary color filters to divide the image into color separation images. The color separation images are respectively projected to spaced image-receiving areas on the web. Alternatively, exposure is accomplished by electronically produced images formed by light emitting diodes or fiber optic arrays, or by laser or flying spot scanners directed at the image-receiving areas. Of course, the invention is also useful with a web in the form of an insulating member having electrical charge induced electrostatic charge patterns or a ferromagnetic member having magnetically produced patterns.

With the subtractive color reproduction process, the latent image charge patterns are respectively developed with complementary primary color (cyan, magenta, yellow) marking particles having an electrostatic charge opposite to that of the latent image charge patterns on the web 12 to form transferable images. Black toner particles are also useful for developing a latent image charge pattern corresponding to that portion of multicolor input information which is black.

The transfer apparatus 10 is located in juxtaposition with the web 12. The web, which travels about a closed loop travel path through electrographic processing stations, is supported adjacent to the surface apparatus by roller 14. A sensor (not shown), remotely located relative to the roller 14, detects marks or perforations M (see FIG. 1) associated with image-receiving areas on the web 12. The sensor produces signals in response to such detection. The signals are received by a logic and control unit L, which includes for example an Intel 8080 microprocessor available from Intel Corporation of Sacramento, California. The unit L utilizes the signals to monitor the location of the image-receiving areas of the web 12 as the web travels about its path, and controls the timing of operation of the electrographic processing stations based on the location of such areas for forming transferable marking particle images on the areas. The unit L also controls the delivery of a receiver sheet, such as bond paper or transparency material, to the transfer apparatus 10 from a sheet supply (not shown). Such delivery is in timed relation to the travel of the image-receiving area of the web, carrying the first of the related transferable images, toward the transfer apparatus.

Figure 2:
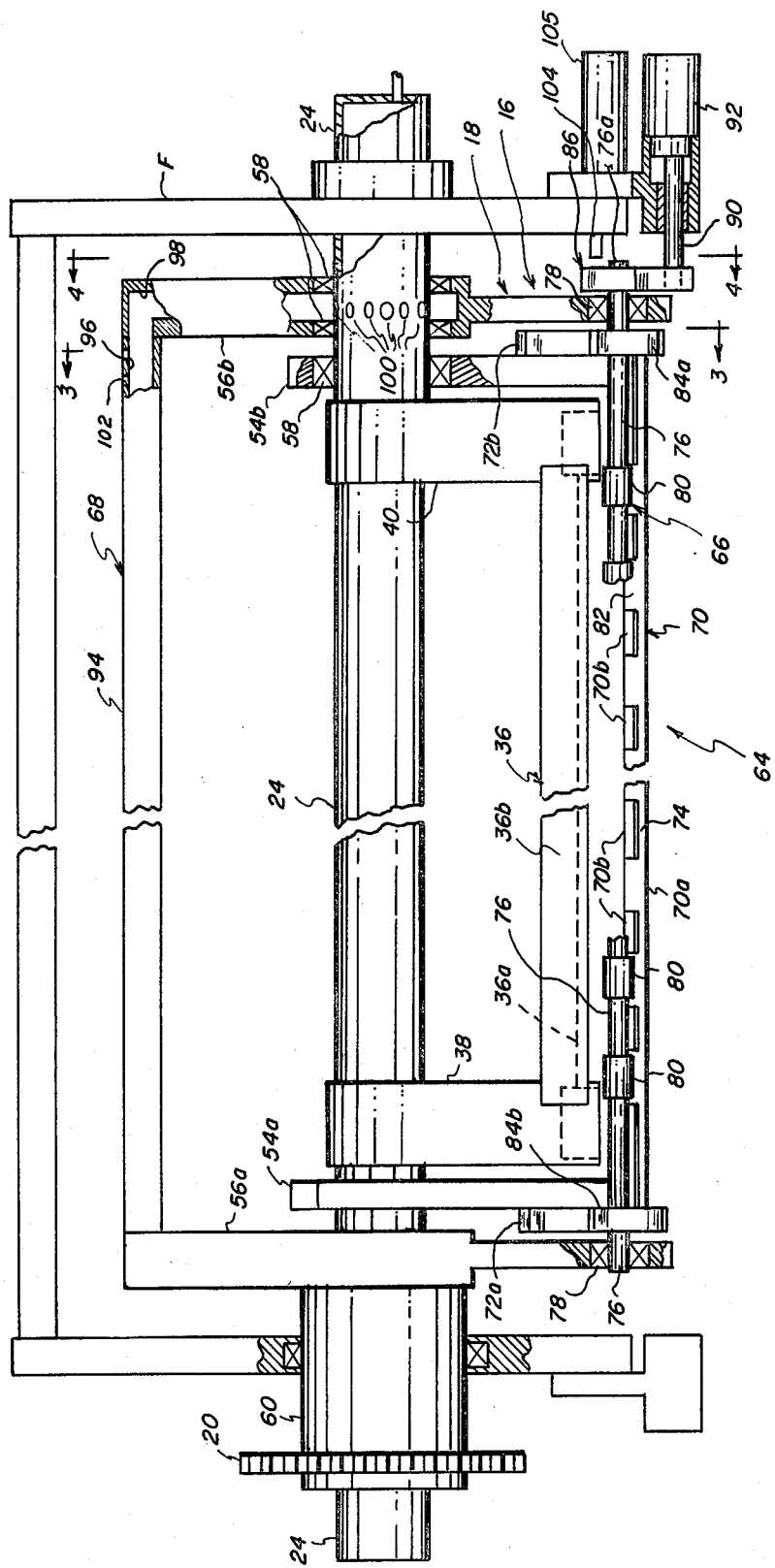
FIG. 2 is a side elevational view, on an enlarged scale, of the apparatus of FIG. 1 with portions removed or broken away to facilitate viewing.

The transfer apparatus 10 is generally of the type disclosed in the aforementioned U.S. patent application Ser. No. 353,779, and is described herein only to the extent necessary for a complete understanding of the improved receiver sheet transport according to this invention. The transfer apparatus 10 includes a receiver sheet gripper 16 and a corona transfer charger 36 (see FIGS. 1 and 2). The gripper 16 comprises two means in the form of a tow bar 18 which captures the lead and trail edges of a receiver sheet, leaving the portion of the sheet intermediate the captured edges self-supporting. The two bar includes a first set of arms 54a, 54b and a second set of arms 56a, 56b. The sets of arms are respectively mounted on bearings 58 for rotation about a stationary hollow shaft 24. The shaft 24 is located with its longitudinal axis parallel to the web 12 and perpendicular to the direction of travel of the web. A hub 60, fixed to the arm 56a and rotatably mounted on the shaft 24, supports a gear 20. A stepper motor 30 (see FIG. 1) has a gear 32 fixed on the output shaft 34 of the motor in mating engagement with gear 20.

The stepper motor 30 is activated by the logic and control unit L to rotate the second set of arms 56a, 56b about the longitudinal axis of shaft 24. The sets of arms are interconnected by spring 62 (one shown in FIGS. 1, 3 and 3a) so that they are rotated substantially in unison when the gear 20 is driven by the stepper motor 30. The first set of arms 54a, 54b support mechanism 64 for guiding and aligning a receiver sheet lead edge; while the second set of arms 56a, 56b carry a mechanism 66 for clamping the lead edge to the mechanism 64, and a mechanism 68 for vacuum capturing the trail edge of such receiver sheet. The spacing of the longitudinal axis of shaft 24 from the web 12, and the spacing of the guiding and aligning mechanism 64 and trail edge capture mechanism 68 from the longitudinal axis of the shaft 24 is such that, when the tow bar 18 is rotated about the axis of the shaft by the stepper motor 30, such mechanisms travel in a path (see FIGS. 3, 3a). The cylinder described by the path P, the longitudinal axis of which is coincident with the longitudinal axis of the shaft 24, has an element in contact with the web 12 adjacent to the charger 36. Such cylinder is of circumferential dimension substantially equal to the linear distance between corresponding points on successive image-receiving areas on the web 12 (i.e., equal to the dimension of an image-receiving area plus the distance between successive areas in the direction of web travel). Therefore, when the tow bar is successively driven about the path, an element of a receiver sheet captured by the tow bar contacts the web 12 under the charger 36 in register with corresponding elements in successive image-receiving areas on the web.

The corona transfer charger 36 (such as that shown in U.S. Pat. No. 3,122,634 issued Feb. 25, 1964 in the name of King) is fixed to brackets 38, 40. The brackets are mounted on the stationary shaft 24 so as to locate the charger in spaced parallel relation to the web 12 and perpendicular to the direction of travel of the web. The length of the charger is selected to span the dimension of the image-receiving area of the web perpendicular to the web travel path. Wires W, connected to a DC or biased AC electrical potential source (not shown) pass through the shaft 24 and are connected to a corona wire 36a of the charger 36 to generate a transfer corona. A shield 36b directs the corona at the area of contact between the captured receiver sheet and web 12. The electrical potential source applies a potential to the corona wire 36a to charge the receiver sheet. The charge on the sheet is of the same polarity but substantially greater absolute value than the charge on the web attracting the marking particles to the web. Accordingly, the transfer corona is effective to overcome such attraction and transfer a marking particle image line-by-line from the moving web to the moving receiver sheet during the time the sheet is in contact with the web.

A receiver sheet (e.g., sheet R shown in FIGS. 3 and 3a), is fed by a transport (not shown) toward the tow bar 18 through a guide 42. The logic and control unit L actuates the stepper motor 30 to position the lead edge guiding and aligning mechanism 64 at the point of intersection of the sheet with the path P of the tow bar immediately prior to the time the lead edge of the sheet intersects such path. The mechanism 64 includes a generally "V" shaped guiding member 70. The member 70 is connected to and extends between plates 72a, 72b fixed on the outboard sides of arms 54a, 54b respectively. Opposed lower surface 70a and upper surface 70b of the member 70 form an opening 74 for receiving the lead edge of a moving receiver sheet. The opposed surfaces of the member 70 intersect along a line 70c transverse to the direction of travel of the web 12, parallel to the lead edge of an image-receiving area on the web 12 in the direction of web travel.

Figure 3:
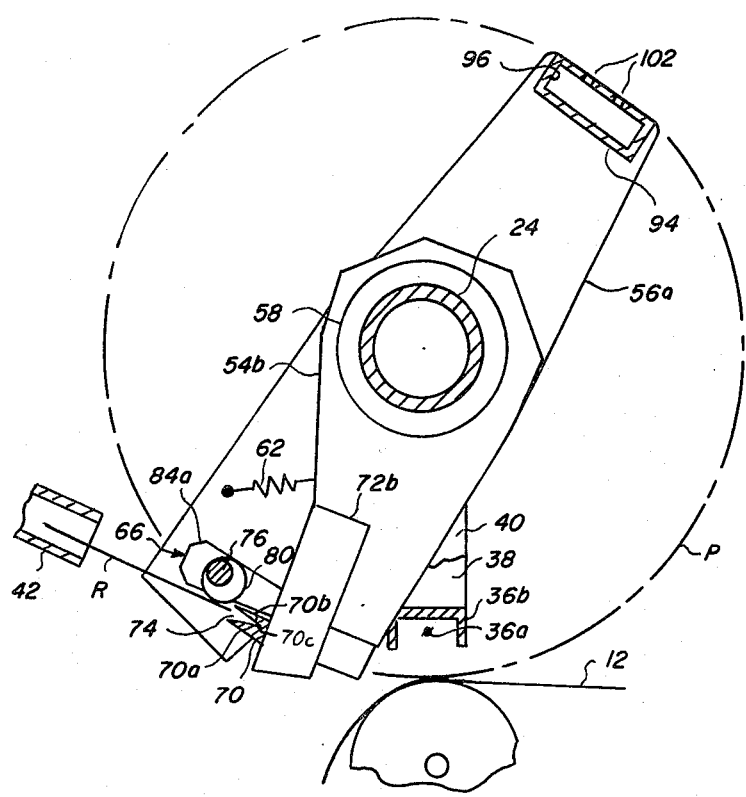
FIG. 3 is a cross-sectional end view of the improved receiver sheet transport, on an enlarged scale, taken along the lines 3—3 in FIG. 2, in position for receiving the lead edge of a receiver sheet.
Figure 6:
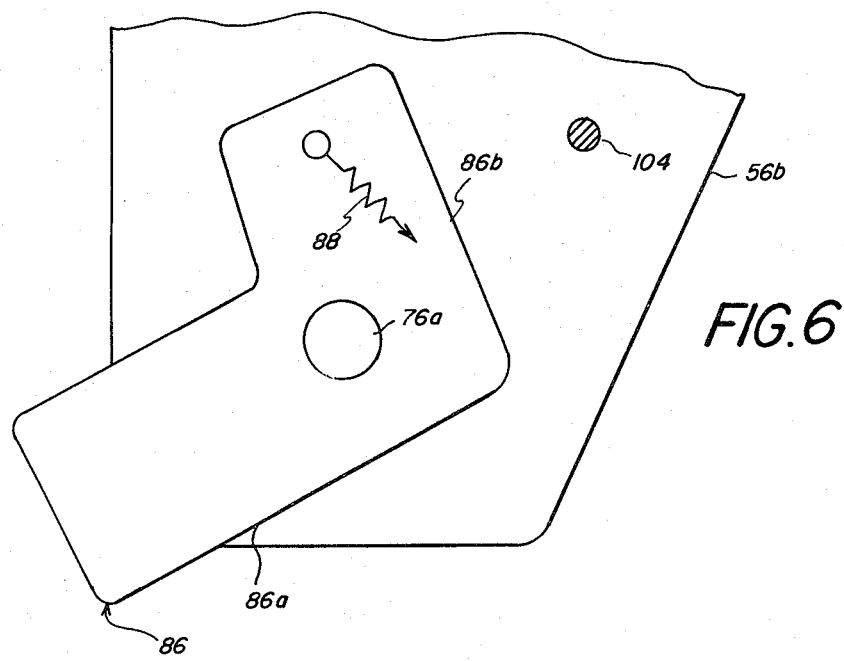

The clamping mechanism 66 includes a shaft 76 extending between the arms 56a, 56b, rotatably supported in bearings 78 carried by such arms. Pressing means in the form of a plurality of lobes 80 are eccentrically mounted on the shaft 76 for rotation with the shaft. The lobes 80 are longitudinal spaced along the shaft respectively opposite a plurality of slots 82. The slots 82 are spaced along an element of the upper surface 70b of the member 70 (see FIGS. 1 and 2). Cams 84a, 84b are also mounted for rotation with the shaft 76, and are located in juxtaposition with plates 72a, 72b respectively. The plates 72a, 72b are urged into engagement with the cams by tension springs 62 connected between the sets of arms 54a, 54b and 56a, 56b respectively. An actuating lever 86, fixed on the end 76a of the shaft 76, is rotatable about the longitudinal axis of such shaft to the position shown in FIG. 4 or the position shown in FIG. 6. The lever 86 is maintained in each of these positions by an overcenter spring 88. The rotation of the lever 86 to its positions rotates the shaft 76, and thus the cams 84a, 84b to set the spacing between the sets of arms to one relative position shown in FIG. 3, or a different relative position shown in FIG. 3a.

The receiver sheet R is transported through the guide 42 toward the opening 74 of the member 70 with a linear velocity greater than the tangential velocity of such member. Accordingly, as the lead edge of such sheet is received in the opening 74, it is guided into position engagement with the line 70c of intersection of the opposed surfaces 70a, 70b. Since such line is parallel to the lead edge of an image-receiving area, engagement of the receiver sheet lead edge and the line serves to remove any skew of the sheet relative to the tow bar 18 and the web 12.

Figure 3A:
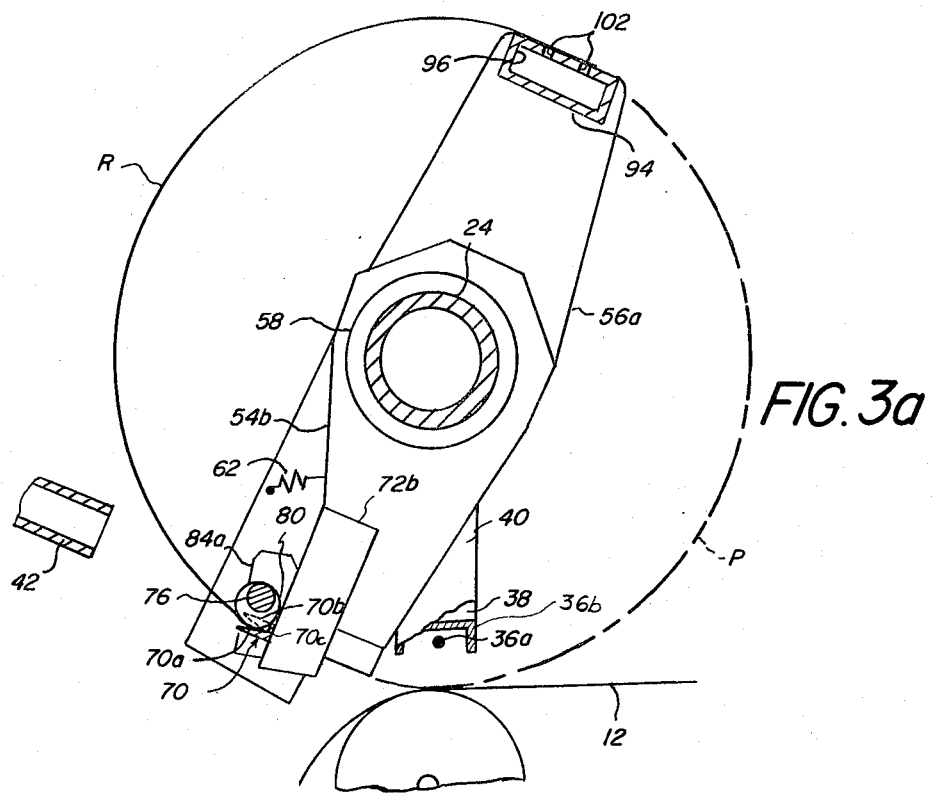
FIG. 3a is an end view of the improved receiver sheet transport, similar to FIG. 3, in an alternate position where the lead and trial edges of a receiver sheet are captured.
Figure 4:
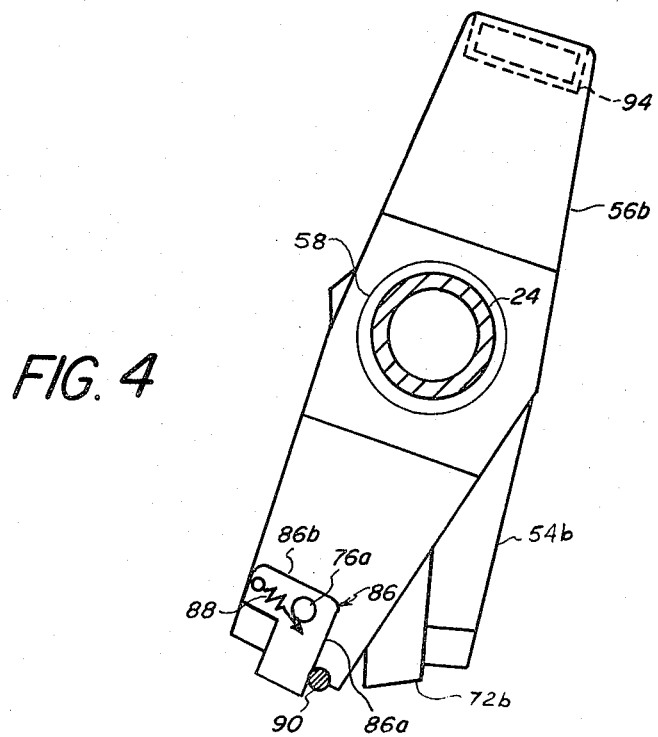
FIG. 4 is a cross-sectional end view of the improved receiver sheet transport, on an enlarged scale, taken along the lines 4—4 in FIG. 2, in the same position as shown in FIG. 3.
Figure 5:
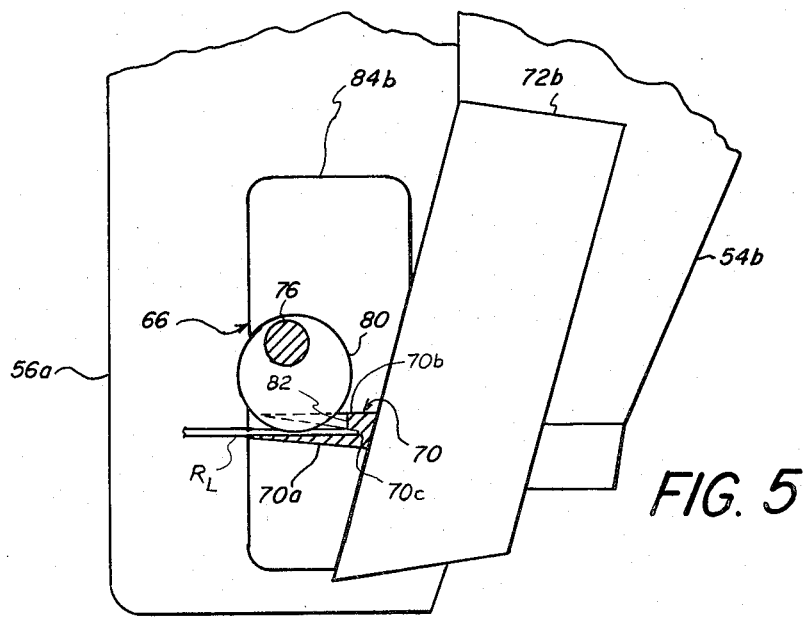
FIG. 5 is an end view of a portion of the apparatus of FIG. 3a, on an enlarged scale.

As the tow bar is driven from the position where a sheet is received, a pin 90 of a solenoid 92, supported in the frame F (see FIG. 2), is moved into the path of the lever 86 by actuation of the solenoid. The solenoid 92, operatively coupled to the logic and control unit L, is actuated by a signal from the unit L generated in response to movement of the tow bar from the sheet receiving position. The pin 90 is engaged by arm 86a of the lever 86 (see FIG. 4) as the tow bar rotates to rotate the lever to the position of FIG. 6. The lever 86 is then maintained in such position by the overcenter spring 88. Rotation of the lever 86 rotates the shaft 76 to locate the cams 84a, 84b to their position for setting the relative spacing of the sets of arms 54a, 54b and 56a, 56b as shown in FIGS. 3a and 5. With such relative spacing, the lobes 80 extend through the slots 82 to press the receiver sheet against the lower surface 70a of the member 70. Therefore, as the tow bar 18 continues to be driven about the path P, the member 70 tows the captured receiver sheet about such path.

After the lead edge of the receiver sheet is clamped to the member 70, the unit L controls actuation of the stepper motor 30 to drive the tow bar 18 in timed relation to movement of the web 12 so that line 70c of member 70 and the lead edge of an image-receiving area of the web arrive under the charger 36 simultaneously. The receiver sheet, with its lead edge in engagement with line 70c, is thus accurately aligned with the image-receiving area of the web. Continued rotation of the tow bar 18 brings that portion of the sheet immediately adjacent to the captured portion into engagement with the web 12. Such sheet portion and the first transferable marking particle image in an image-receiving area on the web arrive under the transfer corona charger 36 in register for transfer of such image to the receiver sheet. The dimension of the captured portion of the sheet falls in the margin area of the image-receiving area. Since no information is contained in the margin area, no information is lost during transfer. As the tow bar 18 continues to move about its path, the tow bar carries the receiver sheet away from contact with the web 12. However, the normal beam strength of the receiver sheet and the electrostatic forces between the sheet and the grounded web cause following successive elements of the sheet to contact the web under the charger 36 before being carried away from the web. Therefore, the sheet conforms to the web at the area of contact, and the corona charge, which is not blocked by the tow bar, transfers the image to the sheet. Since the receiver sheet is accurately aligned with the image-receiving area, transfer of the image from such area to the sheet is in register (i.e. properly positioned) relative to such sheet.

The tangential velocity of the tow bar 18 is controlled by the stepper motor 30 to substantially match the peripheral speed of the web 12. Therefore, there is no relative movement between the sheet and the transferable image on the web during contact so that smearing during transfer is prevented. As discussed above, the length of the path P, described by movement of the tow bar, is equal the linear distance between corresponding points on successive image-receiving areas. Accordingly, when the receiver sheet R is returned into engagement with the web, it is in register with the next image-receiving area on the web. Alternatively, if the path length is greater than the linear distance between corresponding points on successive image-receiving areas, the stepper motor accelerates the tow bar during the time after the trail edge of the receiver sheet passes under the charger 36 and the lead edge is returned to contact the next image-receiving area of the web. Since an area between successive image-receiving areas (interframe) passes under the charger during this time, the lead edge of the sheet will be in register with the next transferable image and no information is lost.

A shaft encoder E is operatively associated with the web support roller 14 (see FIG. 1). The encoder produces signals indicative of the angular position of the roller due to movement of the web 12. Such signals are fed to the logic and control unit L where they are compared with the monitored location of an image-receiving areas of the web based on signals from the aforementioned remote sensor. Such comparison is used to determine whether a particular image-receiving area will reach the transfer station at the proper time relative to the arrival of the captured receiver sheet carried by the tow bar 18. If there is any positional deviation between the image-receiving area and the receiver sheet which would result in a non-registered transfer, the logic and control unit L adjusts the action of the stepper motor 30 during the passage of an interframe area beneath the charger 36 to eliminate such deviation. Such adjustment comprises adding or subtracting steps relative to a predetermined number of steps which are normally required for proper positioning of the receiver sheet relative to the image-receiving area. By such adjustment, such relative movement between the receiver sheet and the web occurs during passage of the interframe area under the transfer charger so that no smearing results, as would occur if such adjustment was made during image transfer.

The trail edge capturing mechanism 68 includes a cross-bar 94 interconnecting arms 56a, 56b. The cross-bar is radially spaced from the longitudinal axis of shaft 24 a distance substantially equal to the spacing of member 70 from the shaft, and is spaced from the shaft 76 a linear distance measured along the path P substantially equal to the dimension of a receiver sheet in the direction of sheet travel. The cross-bar 94 has an internal chamber 96 in flow communication with a passage 98 in the arm 56b (see FIG. 2). The passage 98 is, in turn, in flow communication with a vacuum source V (connected by a conduit to shaft 24) via ports 100 in the shaft 24. The application of vacuum from the source V to the chamber 96 is controlled by a valve 73 (see FIG. 1) operatively coupled to the logic and control unit L. The valve 73 is opened by a signal from the unit L generated in response to movement of the tow bar 18 to a position where the cross-bar is adjacent to the trail edge of the receiver sheet as the trail edge passes under the charger 36. Vacuum applied to the chamber 96 is effective through a plurality of ports 102 in the cross-bar 94 to tack the trail edge of the receiver sheet to the cross-bar. A particular advantage to using vacuum to capture the trail edge of the receiver sheet is that (within limits) variation in sheet size can be accommodated without losing control of the trial edge or requiring adjustment of the trial edge capture mechanism.

The portion of the sheet intermediate the portion tacked to the cross-bar and captured by the clamping mechanism 66 is self-supporting. Such self-supporting portion is coextensive with a portion of the path P described by the tow bar 18, and forms a compliant loop (see FIG. 3a) which is maintained by the beam strength of the sheet. With the lead and trail edges of the receiver sheet secured to the tow bar 18, rotation of the tow bar successively moves the sheet into contact with the web 12 a number of times corresponding to the number of related transferable images on the web for superimposed transfer of the images to the sheet in the manner described above. Successive elements of the sheet loop conform to the area of contact with the web under the transfer corona 36 during each of the subsequent transfers of the images, through the next-to-last transfer. During tow bar movement, power is maintained to the corona charger 36 to effect transfer of the transferable images seriatim to the sheet.

When the tow bar 18 returns the receiver sheet R into contact with the web W to initiate transfer of the last related transferable image, the receiver sheet is released to follow the web toward a downstream location. Release is effected by moving a pin 104 of solenoid 105 (similar to solenoid 92), supported on the frame F, into the path of arm 86b of the lever 86 (see FIG. 6) by actuation of such solenoid. Solenoid 105, operatively coupled to the logic and control unit L, is actuated by a signal from the unit L in response to movement of the tow bar 18 to the position where the receiver sheet contacts the web 12 for the last transfer. The pin 104 is engaged by the arm 86b during rotation of the tow bar to rotate the lever 86 to its position shown in FIG. 4. The overcenter spring 88 then maintains the lever in such position. Rotation of the lever 86 rotates the shaft 76 to locate the cams 84a, 84b to their position for setting the relative spacing of the sets of arms 54a, 54b and 56a, 56b as shown in FIG. 3. With such relative spacing, the lobes 80 are disengaged from the receiver sheet, and the cams move the arms 54a, 54b in an upstream direction to a remote location with respect to the lead edge $R_L$ of the receiver sheet. This effects positive release of the sheet from the member 70. The lead edge of the sheet is thus free to follow the web 12 toward the downstream location. As is the case during the first image transfer, the normal beam strength of the receiver sheet and the electrostatic forces between the sheet and the web 12 cause following successive elements of the sheet to conform to the web at the area of contact under the charger 36, with the sheet traveling at a peripheral speed equal to that of the web. Transfer to the receiver sheet of the last related transferable image is accordingly accomplished in accurate superimposed register with images previously transferred to the receiver sheet.

As the trail edge of the sheet passes under the charger 36 to complete superimposed transfer of the last transferable image to such sheet, valve 73 is closed by a signal from the logic and control unit L to interrupt application of vacuum to the cross-bar 94. The trail edge is thus also released from the tow bar 18 so that the receiver sheet is free to travel with the web 12. Of course, if the vacuum force holding the trail edge to the cross-bar 94 is set at such a level that movement of the receiver sheet with the web can strip the trail edge from the cross-bar, interruption of the vacuum application would not be required. At such downstream location, the sheet is detacked from the web and transported, for example, to a heat and pressure fuser apparatus for permanently fixing the superimposed transferred images to the sheet. Alternatively, the tow bar 18 is used to effect detach by delaying respective release of the captured portions of the receiver sheet for some angle of rotation downstream of the transfer corona 36, with appropriate transport of the sheet directly to the fuser apparatus. Since the receiver sheet has been aligned with the image-receiving area of the web 12 by the line of intersection of the opposed surfaces of member 70, the resultant reproduction is not only formed of accurately registered superimposed transferable images, but is also properly positioned on the receiver sheet. Further, relative movement of the member 70 to a remote location with respect to the receiver sheet at the start of the last image transfer assures positive release of the sheet from such member.

The invention has been described in detail with particular reference to a preferred embodiment thereof, but it will be understood that variations and modifications can be effected within the spirit and scope of the invention.

We claim:

1. In apparatus for transferring related transferable marking particle images seriatim, from spaced areas on a member onto a receiver sheet, such apparatus including tow means for moving a receiver sheet successively into transfer relation with the related transferable images on the member, means mounted on said tow means for attaching a receiver sheet to said tow means with a portion of such sheet intermediate the lead and trail edges being self-supporting, sheet aligning means on said tow means for engaging the lead edge of a receiver sheet to align such receiver sheet with an area on said member so that the images transferred from areas on said member are accurately registered on such sheet, and means for effecting transfer of such related images in accurate superimposed register onto the self-supporting portion of the receiver sheet when such self-supporting portion is in transfer relation with the related transferable images on the member, the improvement comprising:

a member, adjacent to said sheet aligning means, for guiding the lead edge of a receiver sheet into engagement with said sheet aligning means; and means for mounting said guiding member and said sheet aligning means for movement to a first position at which an aligned receiver sheet is urged into clamped engagement with said attaching means by said guiding member, or to a second position at which such receiver sheet is out of clamped engagement with said attaching means, and said guiding member and sheet aligning means are remote from each receiver sheet.

2. The invention of claim 1 wherein said guiding member has opposed surfaces which intersect along a line to form said sheet aligning means, said opposed surfaces defining an opening for receiving a receiver sheet with its lead edge engaging said line.

3. The invention of claim 2 wherein said attaching means includes means for pressing such aligned receiver sheet into clamped engagement with one of said opposed surfaces of said guiding member, and means responsive to movement of said guiding member to said first position for moving said pressing means relative to such surface whereby such lead edge is clamped to such surface.

4. The invention of claim 2 wherein one of said opposed surfaces of said guiding member defines a plurality of slots spaced along an element of such surface; and wherein said attaching means includes a plurality of spaced pressing members associated with said plurality of slots respectively, and means responsive to movement of said guiding member to said first position, for moving said pressing members into said slots toward the other of said opposed surfaces whereby such aligned receiver sheet is clamped to said other of said surfaces and, responsive to movement of said guiding member to said second position for moving said pressing members out of said slots away from said other of said surfaces.

5. The invention of claim 1 wherein said tow means includes a stationary shaft; said mounting means includes a first pair of rotatable arms supported on said stationary shaft; said guiding member, connected to and extending between said first pair of arms, has opposed surfaces which interest along a line to form said sheet aligning means, said opposed surfaces defining an opening for receiving a receiver sheet with its lead edge engaging said line; said attaching means includes a second pair of rotatable arms mounted on said stationary shaft, means for pressing an aligned receiver sheet into clamped engagement with one of said opposed surfaces of said guiding member; means for interconnecting said first pair of arms and said second pair of means; and means for establishing the relative spacing of said first set of arms and said second set of arms at one setting where said pressing means clamps an aligned receiver sheet to said one surface, or at a different setting where said pressing means is out of clamped engagement with such receiver sheet and said opposed surfaces are at a remote location from such released receiver sheet.

6. The invention of claim 5 wherein said pressing means includes a shaft mounted for rotation in at least one of the arms of said second pair of arms, and a lobe eccentrically mounted on such shaft for rotation with such shaft relative to said one surface; whereby when said sets of arms are at said one setting, said pressing means shaft is rotated to locate said lobe for clamping such aligned receiver sheet to said one surface, and when said sets of arms are in said different setting, said pressing means shaft is rotated to locate said lobe out of clampedg engagement with such sheet.

7. The invention of claim 5 wherein said pressing means includes a shaft mounted for rotation in at least one of the arms of said second pair of arms, and said spacing means includes a cam fixed on said pressing means shaft for rotation to a first position or a second position; and wherein said means for interconnecting said first pair of arms with said second pair of arms includes means for constantly urging at least one arm of said first pair of arms into engagement with said cam; whereby when said cam is in its first position, said pairs of arms are in said one setting, and when said cam is in its second position, said pairs of arms are in said different setting.

8. The invention of claim 5 wherein said pressing means includes a shaft mounted for rotation in at least one of the arms of said second pair of arms, and a lever fixed to said pressing means shaft, said lever being rotatable to a first position or a second position, means for rotating said lever to its first position to rotate said pressing means shaft such that said spacing means locates said pairs of arms at said one setting, or to its second position to rotate such shaft such that said spacing means locates said pairs of arms at said different setting, and means for maintaining said lever in its first or second position.

9. The invention of claim 8 wherein said lever includes a first and second arms; and wherein said lever rotating means comprises a first pin adapted to be positioned to be engaged by said first arm of said lever to rotate said lever from its first position to its second position, and a second pin adapted to be positioned to be engaged by said second arm of said lever to rotate said lever from its second position to its first position.

* * * * *